United States Patent Office 2,786,796
Patented Mar. 26, 1957

2,786,796

METHOD OF REPELLING FLIES WITH DIBUTYL-PHENYL MONOETHER POLYGLYCOLS

Vivian H. Melass, Lake Jackson, Tex., assignor to The Dow Chemical Company, Midland, Mich., a corporation of Delaware No Drawing. Application November 27, 1953,
Serial No. 394,875

3 Claims. (Cl. 167—30)

This invention is concerned with insect repellents and is particularly directed to a method of repelling insects and a repellent composition employing certain dibutylphenyl monoethers of polyglycols.

In recent years the development of potent synthetic organic toxicants has served to alleviate in many instances the problems of man and his domestic animals with respect to insects. However, many situations still exist in which it has not been found possible to control insect infestation and attack, and where effective insect repellents are desirable to promote the comfort and health of both man and animals.

It is an object of the present invention to provide a novel method and composition for the repelling of insects. It is a further object to provide such method and composition characterized by ease of application and long-lasting beneficial results. An additional object is to provide a method and composition specifically for the repelling of flies on animals. Other objects will become apparent from the following specification and claims.

According to the present invention it has been discovered that dibutylphenyl monoethers of polyglycols containing 8 to 10 oxyalkylene units, of which at least three such units are oxypropylene units, are highly effective for repelling insects. The repellent polyglycol ethers are oily liquids of low volatility, somewhat soluble in many organic solvents. It is among the advantages of the invention that the polyglycol ethers employed are characterized by marked persistency of insect repellent activity and by ease of application to the sites to be protected. In the latter connection the condensation products appear to exhibit a considerable degree of activity as surface-active agents and are adapted to produce aqueous compositions having desirable wetting and spreading properties.

The polyglycol monoethers employed in the invention are prepared by reacting one molecular proportion of dibutylphenol with 8 to 10 molecular proportions of alkylene oxide. The alkylene oxide employed may be propylene oxide or a mixture of ethylene oxide and propylene oxide provided that in employing mixtures of the latter type the mixture contains a sufficient proportion of propylene oxide to supply at least 3 moles of the latter per mole of phenol in the reaction. The condensation of the phenol and alkylene oxide to produce the desired polyglycol monoether is advantageously carried out at temperatures of 100° to 150° C. under autogenous pressure and in the presence of an alkaline catalyst such as a caustic alkali or the sodium salt of the phenol reactant. If desired, the catalyst may thereafter be removed from the product in the form of sodium carbonate or bicarbonate by adding to the product a small proportion of water and carbon dioxide followed by removal of the water and filtration of the product.

In carrying out the invention, the active polyglycol ether may be applied in any suitable fashion. For example, the polyglycol ether may be applied directly in undiluted form. Alternatively, the polyglycol ether may be dissolved in a suitable solvent such as a lower aliphatic alcohol to prepare lotions or be incorporated into unguents or creams adapted to be rubbed on the skin. Further, the active repellent agent may be dispersed in water to prepare aqueous spray dispersions, suitable, for example, for application to cattle. Similarly, the repellent may be combined with other conventional spray materials such as insecticidal emulsions or dispersions.

In practice, the active polyglycol ether or a composition containing the same is applied so as to cover the area to be protected against insect attack. For example, the undiluted polyglycol ether or a lotion or cream composition thereof may be applied by rubbing or brushing the active material onto the surface to be protected. Similarly aqueous solutions or dispersions may be applied as a brushing composition or dip or by spraying with conventional equipment.

Any suitable proportion of the active polyglycol ether may be employed in the compositions of the invention, provided that the composition is adapted to supply a repellent amount of the active compound when applied to the surface to be protected. In lotions, creams and the like, from 5 to 50 percent or more by weight of the polyglycol ether is employed. In the application of the active repellent compound in an aqueous spray, good results have been obtained when employing one percent or more by volume of the polyglycol ether based on the total volume of such aqueous composition.

The following examples illustrate the invention but are not to be construed as limiting the same:

*Example 1*

4120 grams (20 moles) of technical di(secondarybutyl)phenol having a boiling range of 149°–168° C. at 25 millimeters pressure was reacted with 14 grams of metallic sodium in a pressure kettle which had been purged with nitrogen before introducing the reactants. The resultant mixture was heated to about 100° C. and 11,600 grams (200 moles) of propylene oxide added thereto with stirring and under sufficient pressure to maintain the propylene oxide predominantly in liquid form. The reaction mixture was then maintained at a temperature of 100° to 150° C. and under autogenous pressure for a period of time until the pressure dropped to essentially atmospheric, indicating completion of the reaction. The resulting product, polypropylene glycol mono-(di-secondarybutylphenyl) ether, is a viscous liquid, having a refractive index ($n/D$) of 1.4727 at 25° C. and a specific gravity at 25° C. of 0.981, and soluble in benzene, ethyl alcohol and normal heptane and substantially insoluble in water.

The polyglycol ether prepared as set forth above was applied by brushing to a cow maintained in an area infested with horseflies (Tabanid sp.). Untreated cattle were maintained in the same area to serve as checks. Counts of horseflies alighting or feeding on the cattle were made several times daily and averaged to give a daily average infestation per count on each animal. The counts on untreated animals averaged greated than 4 horseflies per animal for the period starting 4 days before the treatment and continuing until 19 days after the application of the treatment to the test cow. Similar counts were observed on the test animal itself for the 4 days preceding treatment. After application of the polyglycol ether compound the counts of horseflies alighting or feeding on the treated cow dropped to less than one fly observed per counting period for the two days immediately following the treatment and an average repellancy of 75 percent as compared to the check animals was observed for a period of 19 days thereafter.

Example 2

4120 grams (20 moles) of technical di(secondary-butyl)phenol was reacted with 23 grams of metallic sodium and a mixture of 5860 grams (133 moles) of ethylene oxide and 3870 grams (67 moles) of propylene oxide, following the procedure of Example 1. The resulting polyglycol mono-(di-secondarybutylphenyl) ether is a viscous liquid, having a refractive index ($n$/D) of 1.4787 at 25° C. and a specific gravity at 25° C. of 1.031, and soluble in benzene, ethanol and water. An aqueous 10 percent solution of this product had a cloud point of 24°–26° C. 30 milliliters of this polyglycol ether was applied by brushing to a cow maintained in an area infested with horseflies. Counts of horseflies alighting and feeding on the treated cow and on another cow maintained untreated in the same area were recorded as in Example 1. The treated cow was substantially completely free from horsefly attack during a period of 5 days following the treatment. In contrast the daily average horsefly count on the untreated check animal ranged from 6 to over 15 during the above period.

Example 3

The polyglycol mono-(di-secondarybutylphenyl) ether of Example 2 was dispersed in water to prepare an aqueous composition containing one percent by volume of the active polyglycol ether. This composition was sprayed on a cow with a knapsack sprayer operated at about 30 pounds per square inch pressure. The spray was applied so as to accomplish thorough coverage without appreciable runoff and the cow was maintained in an area infested with horseflies. Counts were taken several times daily as in the preceding examples. No horseflies were observed on the treated cow during a period of 6 days.

Example 4

The polyglycol ethers of Examples 1 and 2 were separately dispersed in water to prepare aqueous compositions containing 3 percent by volume of active repellent compound. Each of these compositions was applied to 2 head of cattle with a sprayer operated at 30 to 40 pounds per square inch pressure. The sprayed cattle were thereafter pastured together with unsprayed cattle in an area heavily infested with hornflies. Counts of hornflies feeding on sprayed and unsprayed cattle were taken 3 times daily. Preliminary counts made for three days before the spraying operation had established an average infestation of 31 hornflies per untreated animal per counting period. On the first and second day after spraying, the counts on the sprayed cattle averaged less than three hornflies per animal per counting period while the unsprayed animals remained heavily infested.

Similar repellent compositions are prepared from the product of reaction of one molar proportion of di(tertiarybutyl)phenol with 8 to 10 molar proportions of propylene oxide or of a mixture of ethylene oxide and propylene oxide as set forth above.

I claim:

1. A method for repelling flies which comprises applying to the surface to be protected a dibutylphenyl monoether of a polyglycol, said polyglycol containing 8 to 10 oxyalkylene units and at least 3 of said units being oxypropylene units.

2. A method of repelling horseflies from cattle, which comprises applying to the cattle a dibutylphenyl monoether of a polyglycol, said polyglycol containing 8 to 10 oxyalkylene units and at least 3 of said units being oxypropylene units.

3. A method for repelling flies which comprises applying to the surface to be protected an aqueous dispersion of a dibutylphenyl monoether of a polyglycol, said polyglycol containing 8 to 10 oxyalkylene units and at least 3 of said units being oxypropylene units.

References Cited in the file of this patent
UNITED STATES PATENTS

| | | |
|---|---|---|
| 2,624,706 | Maxcy | Jan. 6, 1953 |
| 2,626,227 | Lambrech | Jan. 20, 1953 |
| 2,674,619 | Lundsted | Oct. 19, 1953 |
| 2,677,700 | Jackson | May 4, 1954 |